United States Patent
Ishii et al.

(10) Patent No.: US 6,529,334 B2
(45) Date of Patent: Mar. 4, 2003

(54) EYEPIECE VARIABLE FOCAL LENGTH OPTICS

(75) Inventors: Shinichiro Ishii, Saitama (JP); Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/851,386

(22) Filed: May 9, 2001

(65) Prior Publication Data

US 2001/0055161 A1 Dec. 27, 2001

(30) Foreign Application Priority Data

May 10, 2000 (JP) .................... 2000-136623

(51) Int. Cl.⁷ .................... G02B 25/00; G02B 15/14
(52) U.S. Cl. .................... 359/644; 359/432; 359/643; 359/686
(58) Field of Search .................... 359/643, 644, 359/685, 686, 432

(56) References Cited

U.S. PATENT DOCUMENTS

| | | | |
|---|---|---|---|
| 5,140,467 A | 8/1992 | Hotta et al. | 359/696 |
| 5,311,355 A | 5/1994 | Kato | 359/432 |
| 5,491,588 A | 2/1996 | Ogawa et al. | 359/676 |
| 5,576,892 A | 11/1996 | Hotta et al. | 359/696 |
| 5,734,509 A | 3/1998 | Ueno | 359/689 |
| 6,104,543 A | 8/2000 | Yano | 359/645 |
| 6,134,052 A | 10/2000 | Yano | 359/689 |
| 6,229,653 B1 | 5/2001 | Kanai | 359/643 |
| 6,384,984 B1 * | 5/2002 | Ishii et al. | 359/645 |

FOREIGN PATENT DOCUMENTS

| | | |
|---|---|---|
| JP | 53-51757 | 5/1978 |
| JP | 62134617 | 6/1987 |

* cited by examiner

Primary Examiner—Georgia Epps
Assistant Examiner—David N. Spector
(74) Attorney, Agent, or Firm—Greenblum & Bernstein, P.L.C.

(57) ABSTRACT

Eyepiece variable focal length optics comprise, in order from the objective optics, a negative lens group, a positive lens group, a positive lens group and a positive lens group; during variable focal length from longest focal length side to shortest focal length side, the first lens group moves monotonically toward the objective optics, the second lens group moves monotonically toward the eye, and the third lens group moves toward the eye in such a way that the distance from the second lens group is first increased and then decreased; the fourth lens group is stationary. The eyepiece variable focal length optics further satisfies the following condition (1):

$$0.4 < \{L23(\max) - L23\}/f(h) \quad (1)$$

where

L23 (max): a maximum value of the axial air gap between the second and third lens groups during variable focal length;

L23: the axial air gap between the second and third lens groups at longest focal length state;

f(h): the shortest focal distance of the overall eyepiece variable focal length optics.

5 Claims, 9 Drawing Sheets

EYEPIECE VARIABLE FOCAL LENGTH OPTICS

BACKGROUND OF THE INVENTION

1. Technical Field

The present invention relates to eyepiece variable focal length optics for use in combination with objective optics as in astronomical telescopes, spotting scopes, binoculars, etc.

2. Related Art

Many proposals have heretofore been made in the art of eyepiece variable focal length optics of the type contemplated by the invention. For instance, U.S. Pat. No. 5,311,355 proposes an afocal variable focal length optics which is a combination of an eyepiece variable focal length optical system with an objective optical system and an erecting optical system. Unexamined Published Japanese Patent Laid-Open Nos. 134617/1987 and U.S. Pat. No. 5,734,509 propose independent eyepiece variable focal length optics which do not include an objective optical system or an erecting optical system. The eyepiece variable focal length system, taken alone and excluding the objective and erecting optical systems, is a so-called OE-ZOOM system consisting of the following three groups in order from the object side, a moving first lens group of negative power, a moving second lens group of positive power, arranged to be opposed to the first lens group with a field stop interposed therebetween, and a fixed third lens group of positive power. The first and second lens groups are moved in opposite directions not only to achieve variable focal length but also to compensate for the position of the virtual image. These conventional eyepiece variable focal length optics mentioned above can achieve variable power ratios of only about 2.

Eyepiece optics are generally required to have adequate eye relief and offer a satisfactorily large apparent visual field, but if this need is met, the optics are prone to become bulky. This tendency becomes noticeable if the variable power ratio approaches 3.

SUMMARY OF THE INVENTION

An object of the present invention is to provide eyepiece variable focal length optics that achieves a variable power ratio of about 3 and which yet is compact and can offer adequately large apparent visual field and long eye relief.

The stated object can be attained by eyepiece variable focal length optics, which comprise in order from objective optics with which it is used in combination, a negative first lens group, a positive second lens group, a positive third lens group and a positive fourth lens group, the first, second and third lens groups moving independently of each other along the optical axis during variable focal length but the fourth lens group being stationary, said eyepiece variable focal length optics satisfying the following condition (1):

$$0.4 < \{L23(\text{max}) - L23\}/f(h) \tag{1}$$

where

L23 (max): a maximum value of the axial air gap between the second and third lens groups during variable focal length;

L23: the axial air gap between the second and third lens groups at the longest focal length state;

f(h): the shortest focal length of the overall eyepiece variable focal length optics.

Preferably, the eyepiece variable focal length optics further satisfies the following condition (1'):

$$0.65 < \{L23(\text{max}) - L23\}/f(h). \tag{1'}$$

When the overall eyepiece variable focal length optics is set at the shortest focal length state, a telescope using the eyepiece variable focal length optics in combination with the objective optics provides the highest magnification, assuming that the objective optics has a fixed focal length. Of course, the objective optics may be constructed as a variable focal length objective optics to further increase the highest magnification.

In a specific embodiment, the respective lens groups are preferably moved as follows during variable focal length from the longest focal length side to the shortest focal length side: the first lens group moves monotonically (simply) toward the objective optics, the second lens group moves monotonically (simply) toward the eye, and the third lens group moves toward the eye in such a way that the distance from the second lens group is first increased and then decreased.

Preferably, the eyepiece variable focal length optics according the invention further satisfies the following condition (2):

$$7.0 < L12/f(h) \tag{2}$$

where

L12: the axial air gap between the first and second lens groups at the shortest focal length state.

More preferably, the eyepiece variable focal length optics according to the invention further satisfies the following conditions (3) and (4):

$$2.0 < f4/f23 < 4.0 \tag{3}$$

$$0.3 < f23/f2 < 0.6 \tag{4}$$

where f4: the focal length of the fourth lens group;

f23: the composite focal length of the second and third lens groups at the longest focal length state;

f2: the focal length of the second lens group.

More preferably, the eyepiece variable focal length optics according to the invention further satisfies the following condition (1'):

$$0.65 < \{L23(\text{max}) - L23\}/f(h). \tag{1'}$$

The present disclosure relates to the subject matter contained in Japanese Patent Application No. 2000-136623 (filed on May 10, 2000), which is expressly incorporated herein by reference in its entirety.

BRIEF DESCRIPTION OF THE INVENTION

Figure 17:
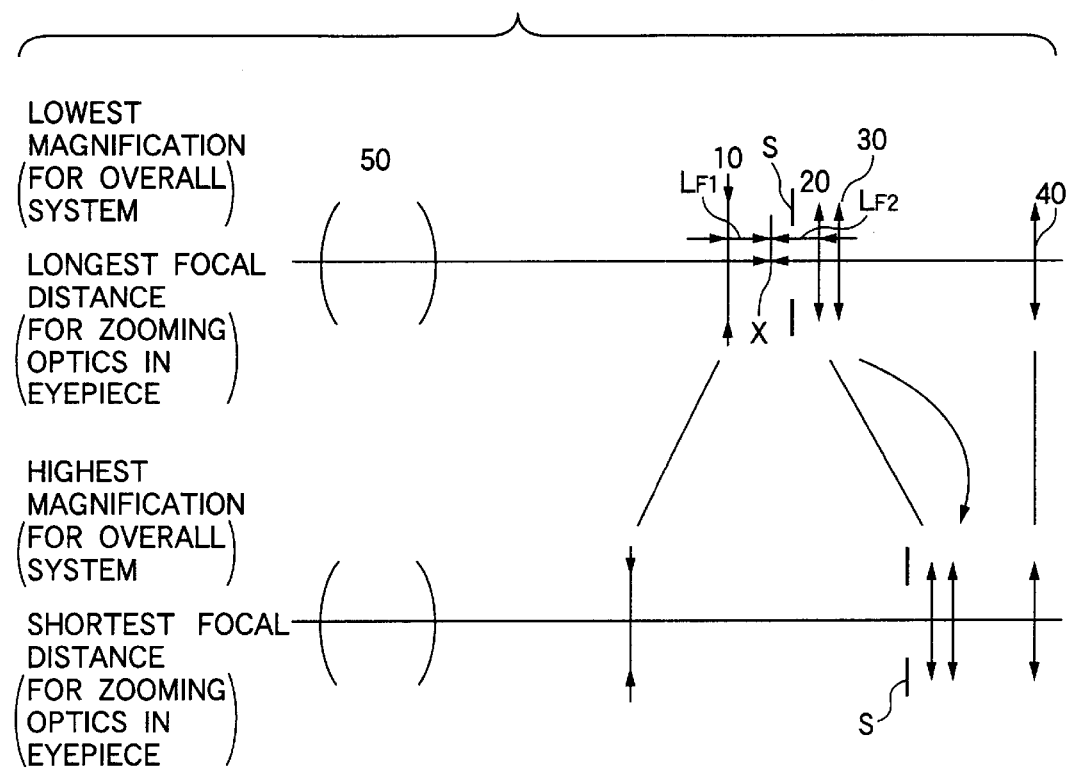
Figure 18:
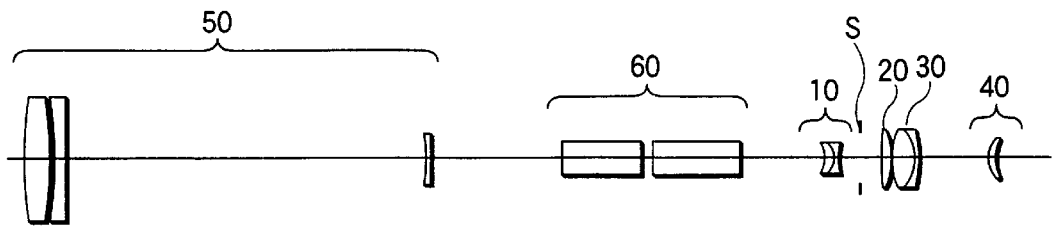

FIG. 17 shows schematically the movement of lens groups that occurs when the eyepiece variable focal length optics according to the invention is adjusted from the lowest focal length state to the highest focal length state; and FIG. 18 is a simplified diagram showing schematically the lens configuration of a telescope including the eyepiece variable focal length optics constructed in Example 2 of the invention.

DETAILED DESCRIPTION OF PREFERRED EMBODIMENT

As shown in FIG. 17, the eyepiece variable focal length optics according to the invention are used in combination with objective optics 50 and comprise, in order from the objective optics 50 (or the object side), a negative first lens group 10, a field stop S, a positive second lens group 20, a positive third lens group 30 and a positive fourth lens group 40. During variable focal length, the first lens group 10, second lens group 20 and third lens group 30 are moved independently of each other along the optical axis but the fourth lens group 40 is stationary. More specifically, when the magnification of the overall optics (the ratio of the focal length of the objective optics 50 to that of the eyepiece variable focal length optics ) changes from minimum to maximum (i.e., when the focal length of the eyepiece variable focal length optics changes from the longest to the shortest), the first lens group 10 moves monotonically (simply) toward the object, the second lens group 20 moves monotonically (simply) toward the eye, and the third lens group 30 moves toward the eye in such a way that the distance from the second lens group 20 is first increased and then decreased. The field stop S moves with the second lens group 20.

The condition (1) should be met in order to ensure that the eye relief does not change greatly during variable focal length.

If the lower limit of condition (1) is not reached, the eye relief decreases considerably at the intermediate focal length state.

The condition (2) should be met in order to ensure that the space in which the first, second and third lens groups move during variable focal length is large enough to produce an increased variable power ratio. As another advantage, if this condition is met, the distance to the first lens group from the object image formed between the first and second lens group (the image formed by the objective optics in the focal position of the objective optics) and the distance from such object image to the second lens group are each increased, making the flaws and dust on the lens surfaces less noticeable.

A specific discussion follows. In a telescope or the like, the eyepiece optics is, in general, designed to form a virtual image at a position of about −1 diopter from a person viewing a real image formed by the objective optics in order to readily observe the real image. Therefore, if a lens surface or the like is located at or close to the real image thus formed, the flaws and dust on the lens surface are consequently observed together with the real image. The diopters D1 and D2 (i.e. differences in distance that can separate positions of virtual images with respect to the lens surfaces in the first lens group 10 and the second lens group 20, which are respectively at distances LF1 and LF2 from the focal position X of the objective optics 50, from a position of a virtual image with respect to the focal position X) are expressed by the following equations:

$$D1 = +1000 \times LF1/f_{2-4}^2 \text{ (in diopters)}$$

$$D2 = -1000 \times LF2/f_{2-4}^2 \text{ (in diopters)}$$

where
LF1: the distance from the focal position X of the objective optics to the lens surface of the first lens group which is nearest the eye;
LF2: the distance from the focal position X of the objective optics to the lens surface of the second lens group which is nearest the objective optics;
$f_{2-4}$: the focal length of the optics located closer to the eye than the focal position X of the objective optics.

The flaws and dust on lens surfaces are problematic at low magnification where the lens surfaces are nearest the focal position X and the problem is noticeable unless the absolute values of D1 and D2 are reasonably large. The absolute values of D1 and D2 can be increased by increasing the values of LF1 and LF2. In order to provide high variable power ratio with the values of LF1 and LF2 for low magnification being sufficiently increased, it is necessary that the distance between the first and lens groups at high magnification should be made reasonably large so that a sufficient space is ensured for the movement of these two lens groups. If the condition (2) is met, a sufficient distance is provided between the first and second lens groups at high magnification that the values of LF1 and LF2 can also be increased at low magnification to make the flaws and dust on the lens surfaces less noticeable.

If the lower limit of condition (2) is not reached, the image plane becomes so close to lens surfaces at low magnification that the flaws and dust on the lens surfaces become noticeable. If one wants to ensure adequate variable power ratio while reducing the amount of the lens group movement so that the image plane will not become unduly close to the lens surfaces, the power of the second lens group has to be increased but this simply makes it difficult to correct aberrations such as astigmatism and distortion.

The condition (3) should be met in order to achieve size reduction.

If the lower limit of this condition is not reached, the amount of the movement of the second and third lens groups is increased, making it impossible to achieve size reduction. If the higher limit of condition (3) is exceeded, correction of aberrations, in particular, astigmatism and distortion, becomes difficult.

The condition (4) relates to the power ratio between the second and third lens groups. In order to achieve high variable power ratio with small amount of the lens movement, the second and third lens groups having positive powers must each have a large positive power, and for aberrational correction, it is advantageous to distribute substantially equal positive powers between these two lens groups. If the higher limit of condition (4) is exceeded, the positive power of the second lens group is unduly strong. If the lower limit of condition (4) is not reached, the positive power of the third lens group is unduly strong. In either case, difficulty is involved in the correction of astigmatism and distortion. To meet an additional requirement for correcting chromatic aberration, either the second lens group or the third lens group or both of these preferably consist of a positive lens and a negative lens cemented together.

Specific examples of the invention are described below. In the accompanying graphs for axial chromatic aberration (as represented by spherical aberration) and lateral chromatic aberration, d-, f- and C-lines represent aberrations at the respective wavelengths. In the graphs for astigmatism, S and M refer to sagittal and meridional; ER above the vertical axis of the graphs for axial chromatic aberration stands for the diameter of the exit pupil; and B above the graphs for lateral chromatic aberration, astigmatism and distortion refer to apparent visual field (in degrees by half). The symbols used in Tables 1–4 below have the following meanings: W, real visual field (in degrees by half); fo, the focal length of the objective optics; fe, the focal length of the eyepiece variable focal length optics in eyepiece; r, the radius of curvature; d, the thickness of a lens element or the distance between adjacent lens elements; $N_d$, the refractive index at d-line; v, Abbe number. The symbol EP appearing in the diagrams for lens configuration denotes the eye point.

The four examples described below assume the use of eyepiece variable focal length optics in a telescope as mounted behind objective optics and an erecting prism in unfolded form that are each common to the four examples. FIG. 18 shows an exemplary system in which the eyepiece variable focal length optics according to Example 2 are combined with the objective optics 50 and the erecting optics 60. The objective optics are not limited to any particular types and those for use in astronomical telescopes and microscopes may be employed. If no erect image need be created, the erecting prism may be omitted.

EXAMPLE 1

Figure 1:
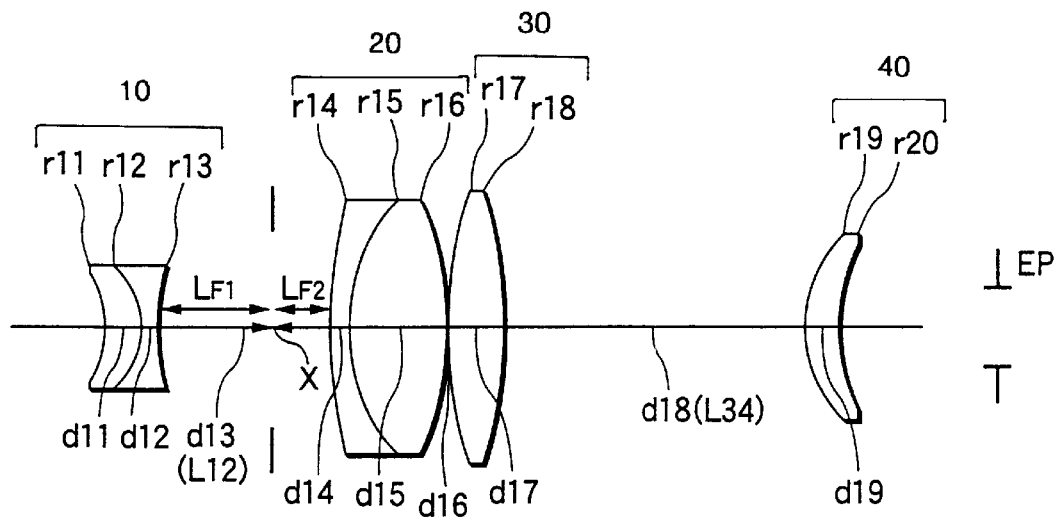
FIG. 1 is a simplified diagram showing schematically the lens configuration of the eyepiece variable focal length optics according to Example 1 of the invention.
Figure 2:
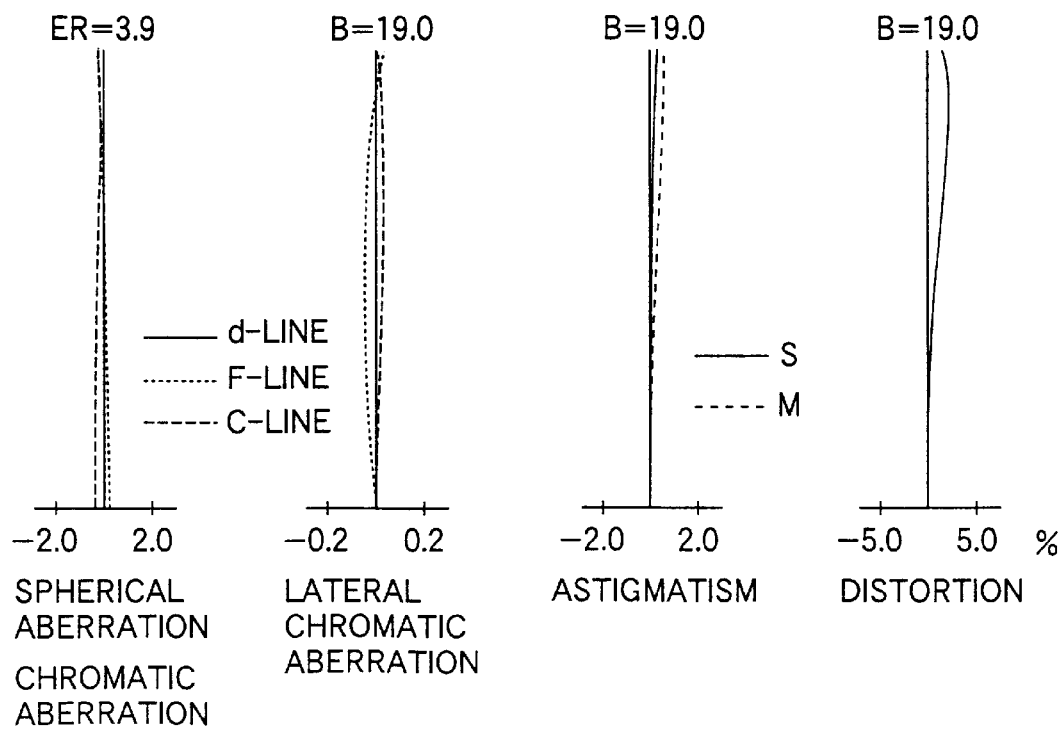
FIG. 2 is a graph showing the aberrations that occur in a system comprising objective optics and the lens configuration shown in FIG. 1 as the optics of FIG. 1 is set at the longest focal length state (to provide the lowest magnification of the overall optical system including the objective optics and the eyepiece variable focal length optics)
Figure 3:
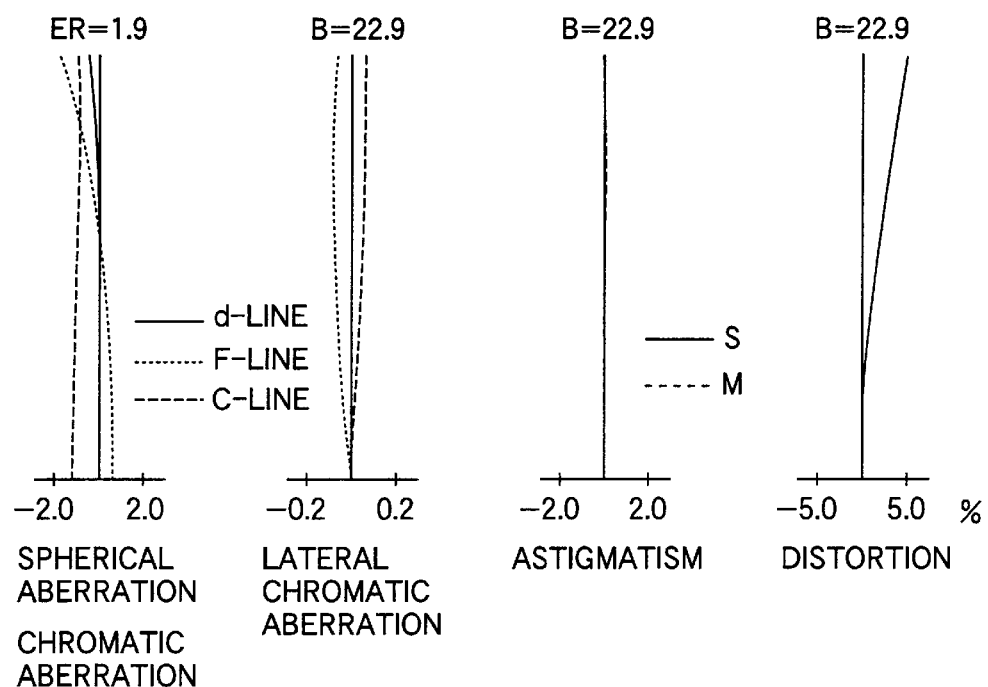
FIG. 3 is a graph showing the aberrations that occur in the same system as the lens configuration shown in FIG. 1 as the optics of FIG. 1 is set at the intermediate focal length state.
Figure 4:
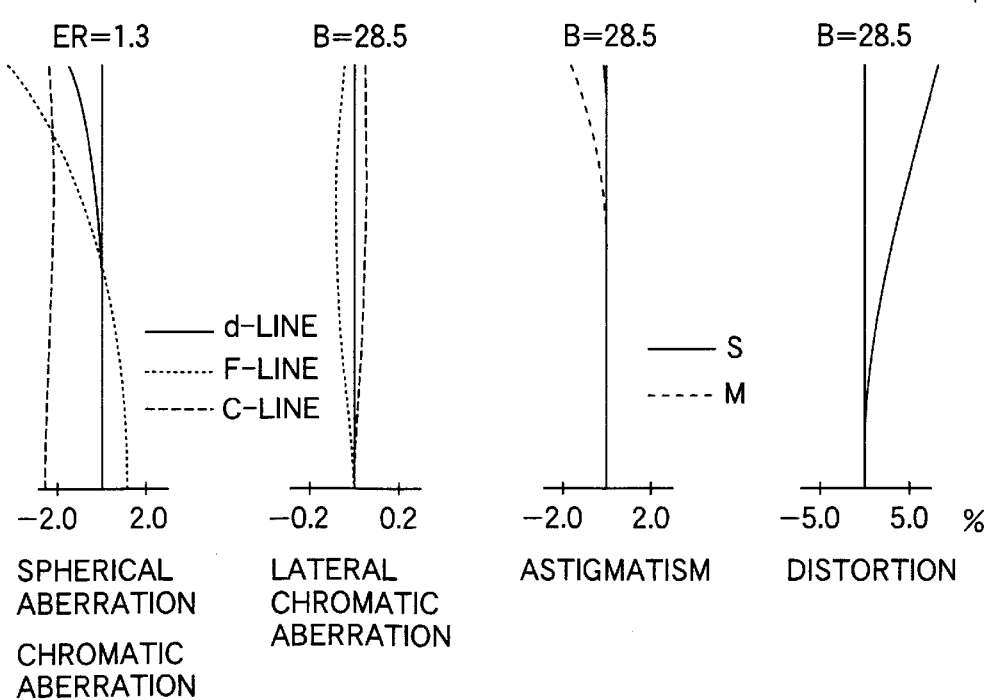
FIG. 4 is a graph showing the aberrations that occur in the same system as the lens configuration shown in FIG. 1 as the optics of FIG. 1 is set at the shortest focal length (to provide the highest magnification of the overall optical system including the objective optics and the eyepiece variable focal length optics)

FIG. 1 shows the lens configuration of the eyepiece variable focal length optics according to Example 1 for the case where it is set at the longest focal length state (to give the lowest magnification if they are used in a telescope). FIGS. 2, 3 and 4 are graphs showing the aberrations that occur in the combination of the eyepiece variable focal length optics with the objective optics when the former optics are set at the longest focal length state, the intermediate focal length state distance (to give intermediate magnification as telescope) and the shortest focal length state (to give the highest magnification as telescope), respectively. Table 1 lists the numerical data for the overall system including the objective optics 50; surface Nos. 1–6 refer to the objective optics 50 (not shown); surface Nos. 7–10 refer to the erecting optics 60 (not shown); surface Nos. 11–13 refer to the negative first lens group 10; surface Nos. 14–16 refer to the positive second lens group 20; surface Nos. 17 and 18 refer to the positive third lens group 30; and surface Nos. 19 and 20 refer to the positive fourth lens group 40. The objective optics 50 comprise in order from the object side a positive lens, a negative lens and a negative lens; the erecting optics 60 have two reflecting faces and consist of two right angle triangular prisms; the first lens group 10 is a cemented lens comprising a positive lens and a negative lens in order from the objective optics; the second lens group 20 is a cemented lens comprising a negative lens and a positive lens in order from the objective optics; the third lens group 30 consists of a positive single lens; and the fourth lens group 40 also consists of a positive single lens. For zooming from low to high magnification, the first through third lens groups are moved independently of each other such that the first lens group 10 is moved toward the objective optics 50 and the second lens group 20 and the third lens group 30 toward the eye. Field stop S is located 12.26 mm away from surface No. 14 toward the objective optics.

TABLE 1

W = 1.0–0.6–0.5 (by half)
fo = 500.0
fe = 24.4–11.7–8.3 (variable power ratio: 2.9)
B = 19.0°–22.9°–28.5° (by half)
Eye relief = 21.0–23.6–27.2
Eyesight = −1

| Surface No. | r | d | $N_d$ | ν |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | −1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |
| 9 | ∞ | 53.600 | 1.51680 | 64.2 |
| 10 | ∞ | 49.391–42.637–40.906 | — | — |
| 11 | −21.073 | 6.000 | 1.84666 | 23.8 |
| 12 | −14.000 | 2.500 | 1.62041 | 60.3 |
| 13 | 54.000 | 27.385–59.912–81.593 | — | — |
| 14 | 104.000 | 2.800 | 1.84666 | 23.8 |
| 15 | 33.306 | 14.620 | 1.62041 | 60.3 |
| 16 | −57.456 | 0.300–7.300–0.300 | — | — |
| 17 | 68.000 | 8.440 | 1.62041 | 60.3 |
| 18 | −96.466 | 46.771–13.999–1.030 | — | — |
| 19 | 22.152 | 5.150 | 1.58913 | 61.2 |
| 20 | 29.440 | — | — | — |

EXAMPLE 2

Figure 5:
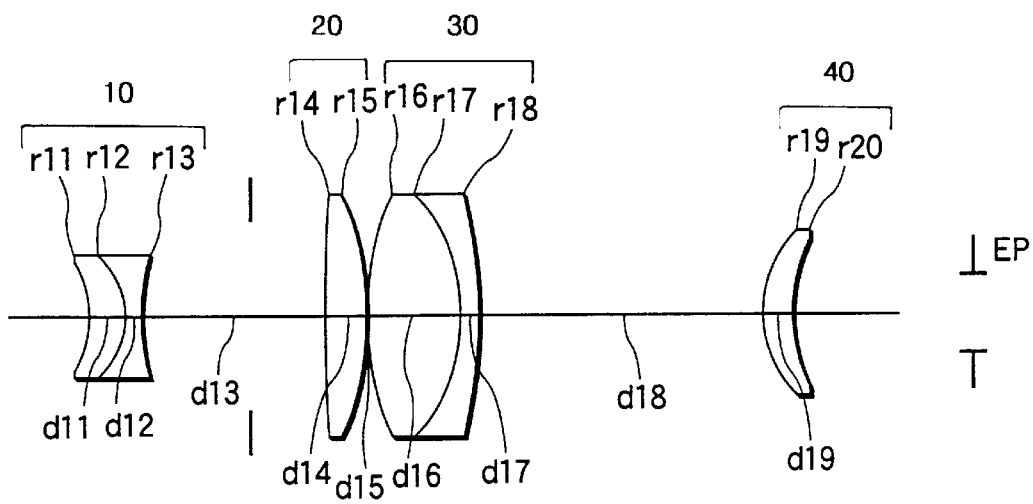
FIG. 5 is a simplified diagram showing schematically the lens configuration of the eyepiece variable focal length optics according to Example 2 of the invention.
Figure 6:
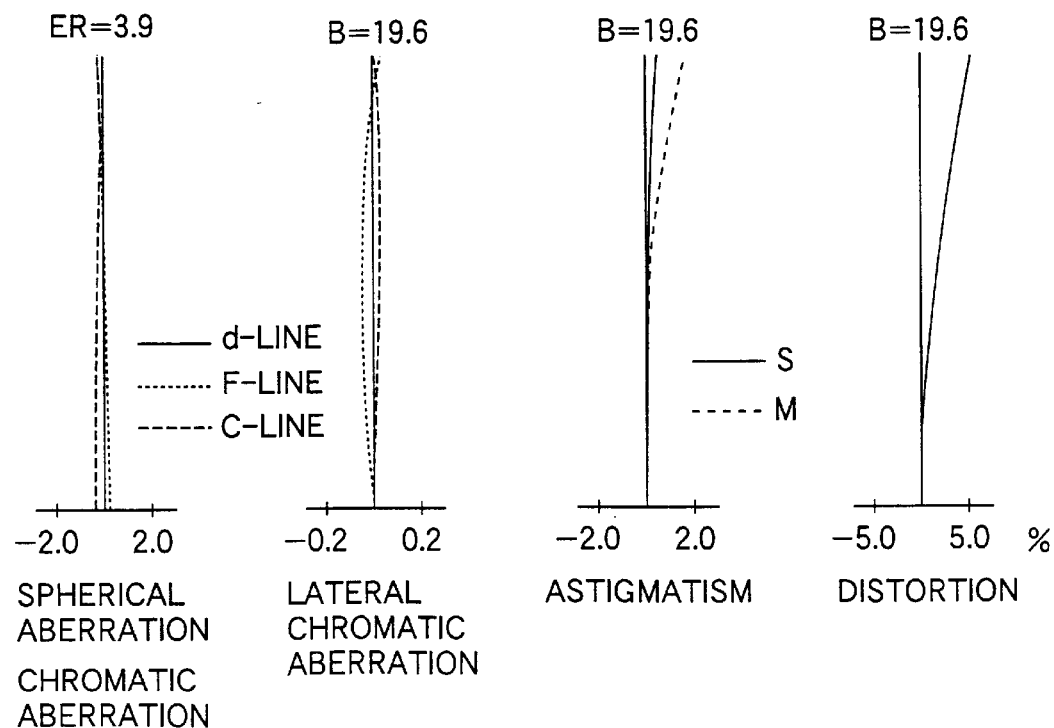
FIG. 6 is a graph showing the aberrations that occur in a system comprising objective optics and the lens configuration shown in FIG. 5 as the optics of FIG. 5 is set at the longest focal length state (to provide the lowest magnification of the overall optical system including the objective optics and the eyepiece variable focal length optics)
Figure 7:
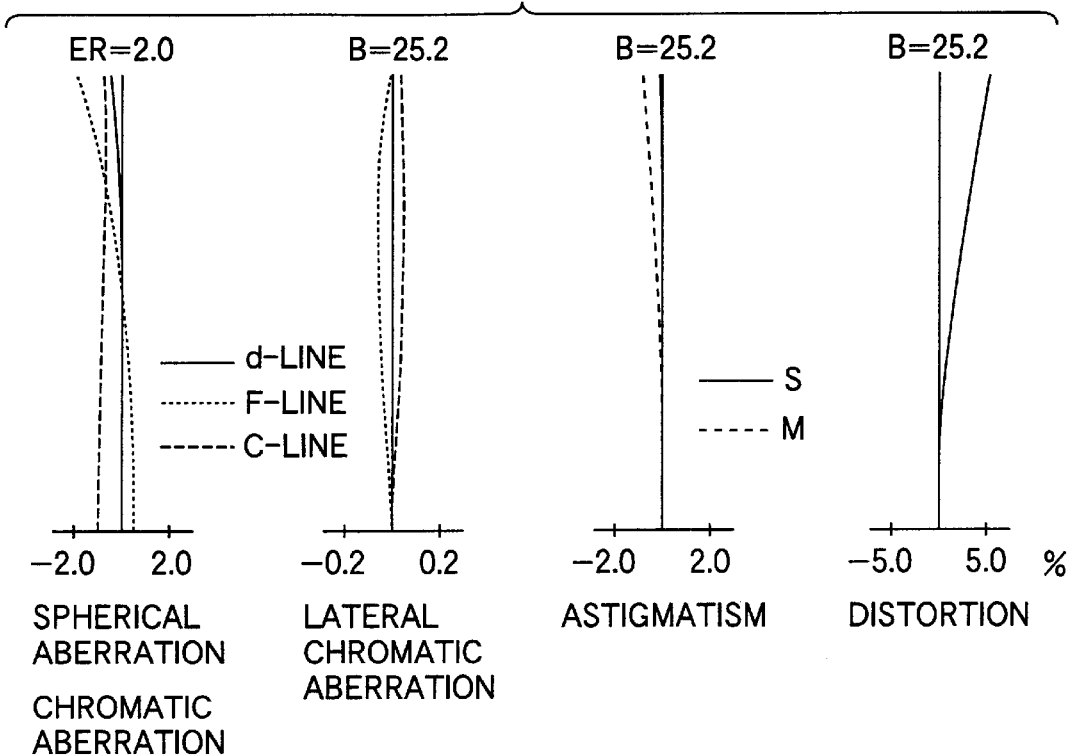
FIG. 7 is a graph showing the aberrations that occur in the same system as the lens configuration shown in FIG. 5 as the optics of FIG. 5 is set at the intermediate focal length state.
Figure 8:
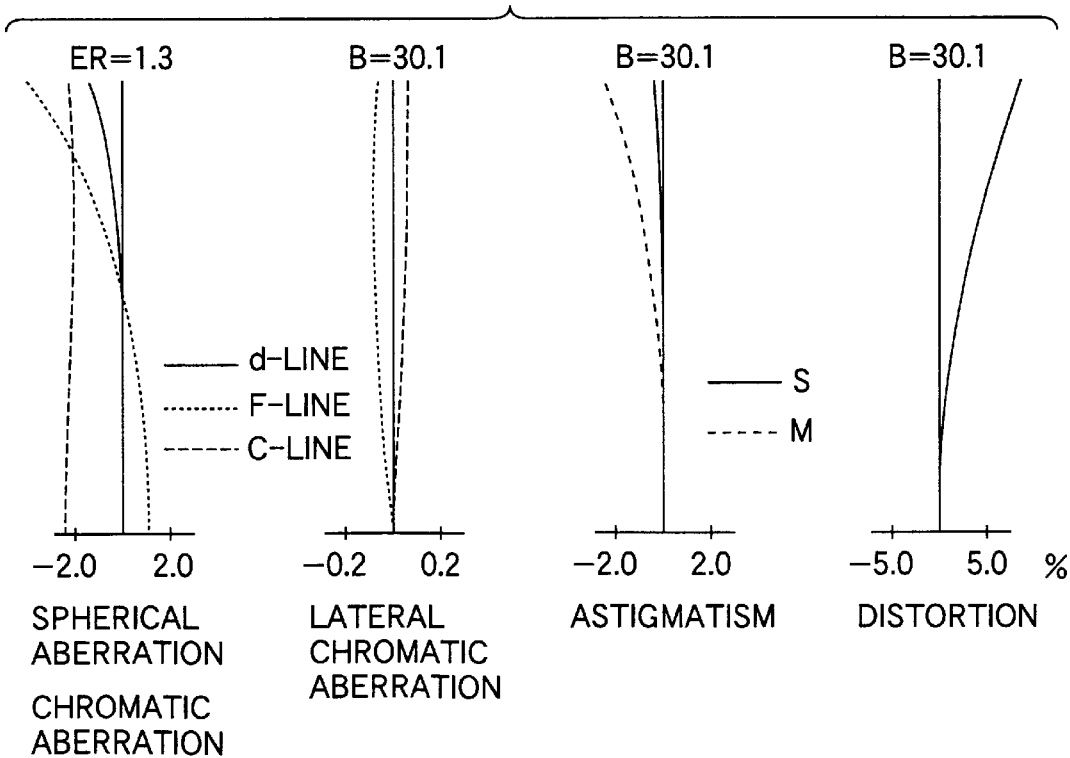
FIG. 8 is a graph showing the aberrations that occur in the same system as the lens configuration shown in FIG. 5 as the optics of FIG. 5 is set at the shortest focal length state (to provide the highest magnification of the overall optical system including the objective optics and the eyepiece variable focal length optics)

FIG. 5 shows the lens configuration of the eyepiece variable focal length optics according to Example 2 for the case where it is set at the longest focal length state (lowest magnification). FIGS. 6, 7 and 8 are graphs showing the aberrations that occur in the combination of the eyepiece variable focal length optics with the objective optics when the former optics are set at the longest focal length state, the intermediate focal length state (intermediate magnification) and the shortest focal length state (highest magnification), respectively. Table 2 lists the numerical data for the overall system including the objective optics. Except that the second lens group 20 solely consists of a positive single lens and that the lens group 30 consists of a positive lens and a negative lens cemented together, the basic lens configuration is the same as in Example 1 and so is the mode of lens group movements during variable focal length. Field stop S is located 12.50 mm away from surface No. 14 toward the objective optics.

TABLE 2

W = 1.0–0.6–0.5 (by half)
fo = 500.0
fe = 24.4–12.3–8.2 (variable power ratio: 3.0)
B = 19.6°–25.2°–30.1° (by half)
Eye relief = 15.3–18.5–20.8
Eyesight = −1

| Surface No. | r | d | $N_d$ | ν |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | 1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |
| 9 | ∞ | 53.600 | 1.51680 | 64.2 |
| 10 | ∞ | 50.125–44.114–42.058 | — | — |
| 11 | −18.907 | 6.000 | 1.84666 | 23.8 |
| 12 | −13.467 | 2.500 | 1.58913 | 61.2 |
| 13 | 55.762 | 26.209–52.945–75.002 | — | — |
| 14 | 261.870 | 6.200 | 1.69680 | 55.5 |
| 15 | −55.048 | 0.300–7.800–0.300 | — | — |
| 16 | 50.165 | 13.700 | 1.58913 | 61.2 |
| 17 | −32.500 | 2.300 | 1.84666 | 23.8 |
| 18 | −73.562 | 41.731–13.505–1.000 | — | — |
| 19 | 21.988 | 5.000 | 1.62041 | 60.3 |
| 20 | 33.299 | — | — | — |

EXAMPLE 3

Figure 9:
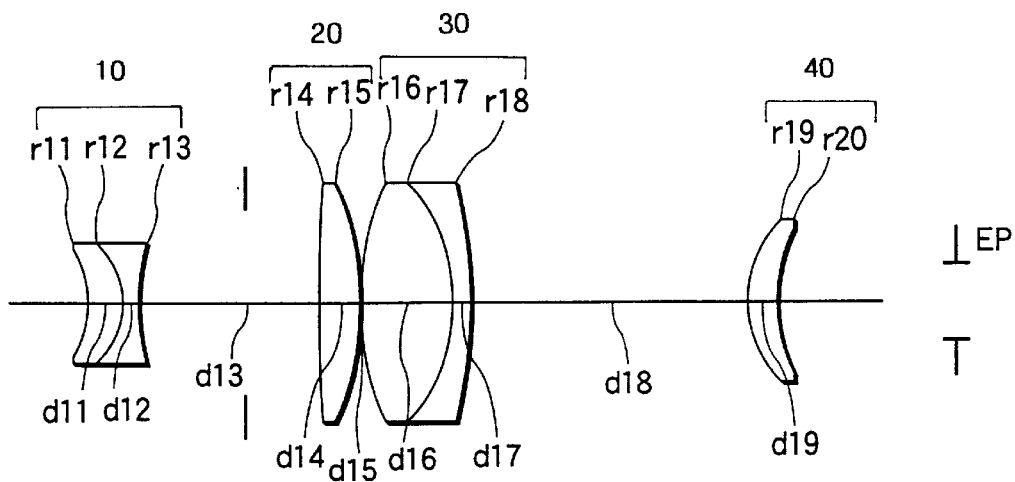
FIG. 9 is a simplified diagram showing schematically the lens configuration of the eyepiece variable focal length optics according to Example 3 of the invention.
Figure 10:
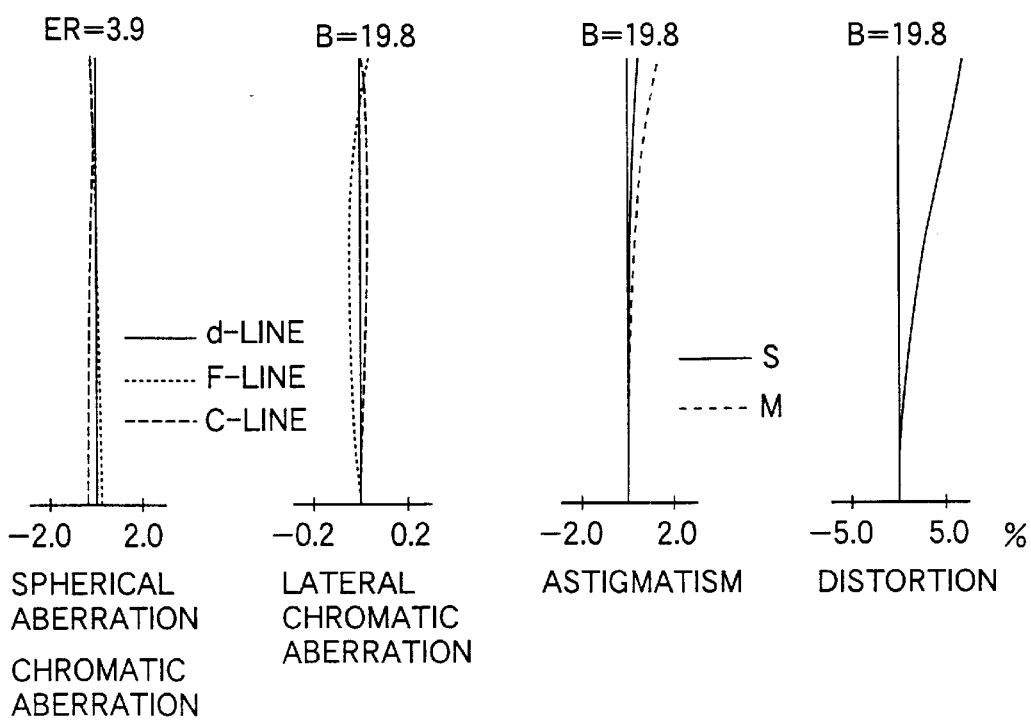
FIG. 10 is a graph showing the aberrations that occur in a system comprising objective optics and the lens configuration shown in FIG. 9 as the optics of FIG. 9 is set at the longest focal length state (to provide the lowest magnification of the overall optical system including the objective optics and the eyepiece variable focal length optics)
Figure 11:
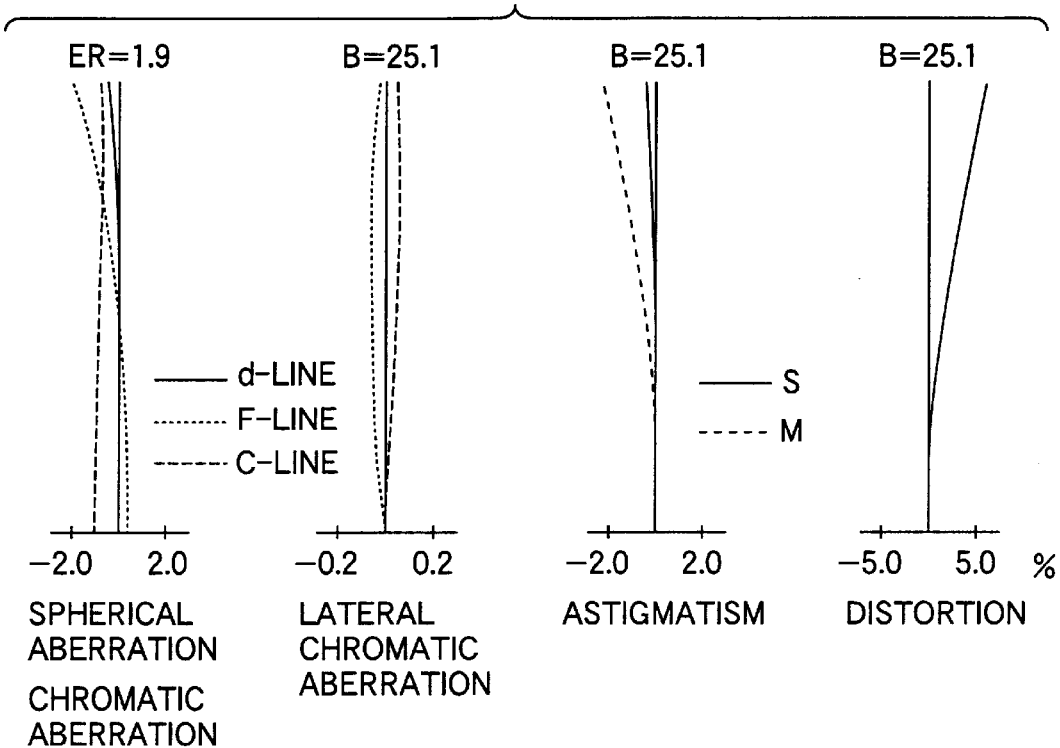
FIG. 11 is a graph showing the aberrations that occur in the same system as the lens configuration shown in FIG. 9 as the optics of FIG. 9 is set at the intermediate focal length state.
Figure 12:
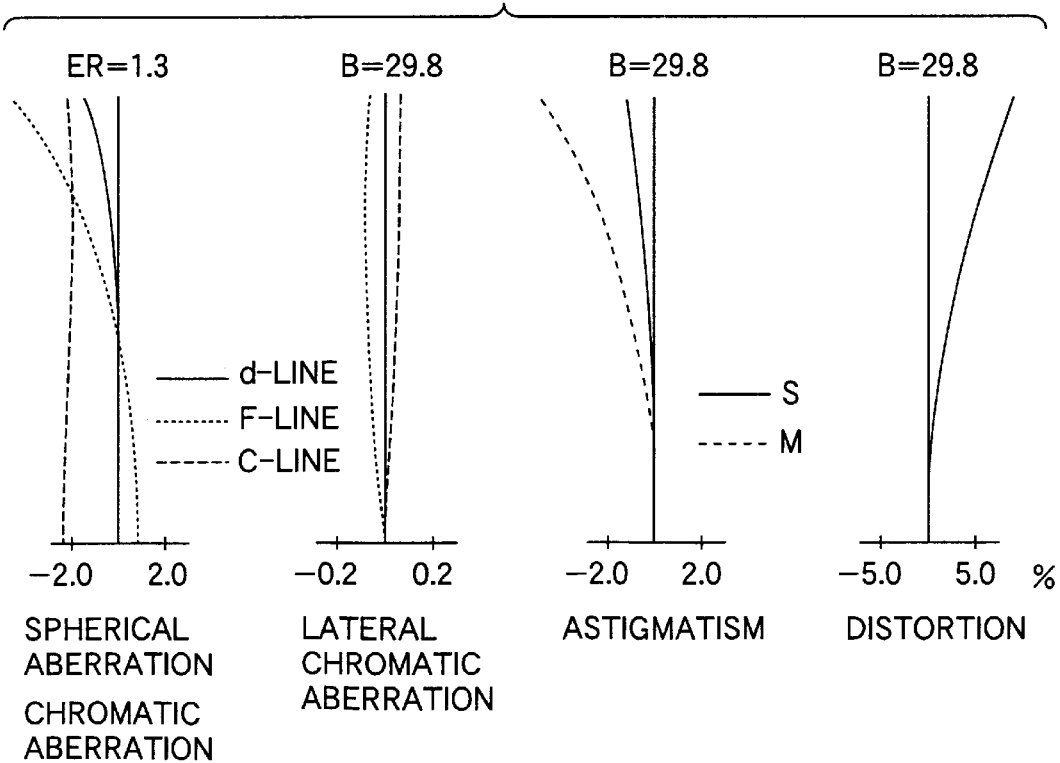
FIG. 12 is a graph showing the aberrations that occur in the same system as the lens configuration shown in FIG. 9 as the optics of FIG. 9 is set at the shortest focal length state (to provide the highest magnification of the overall optical system including the objective optics and the eyepiece variable focal length optics)

FIG. 9 shows the lens configuration of the eyepiece variable focal length optics according to Example 3 for the case where it is set at the longest focal length state (lowest magnification). FIGS. 10, 11 and 12 are graphs showing the aberrations that occur in the combination of the eyepiece variable focal length optics with the objective optics when the former optics are set at the longest focal length state, the intermediate focal length state (intermediate magnification) and the shortest focal length state (highest magnification), respectively. Table 3 lists the numerical data for the overall system including the objective optics. The basic lens configuration and the mode of lens group movements during variable focal length are the same as in Example 2. Field stop S is located 14.35 mm away from surface No. 14 toward the objective optics.

TABLE 3

W = 1.0–0.6–0.5 (by half)
fo = 500.0
fe = 24.5–12.0–8.3 (variable power ratio: 3.0)
B = 19.8°–25.1°–29.8° (by half)
Eye relief = 15.0–17.8–20.7
Eyesight = −1

| Surface No. | r | d | $N_d$ | ν |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | −1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |
| 9 | ∞ | 53.600 | 1.51680 | 64.2 |

TABLE 3-continued

| | | | | |
|---|---|---|---|---|
| 10 | ∞ | 51.208–44.458–42.568 | — | — |
| 11 | −18.240 | 6.000 | 1.84666 | 23.8 |
| 12 | −13.500 | 2.500 | 1.58913 | 61.2 |
| 13 | 59.835 | 25.550–53.744–73.882 | — | — |
| 14 | 247.834 | 6.466 | 1.69680 | 55.5 |
| 15 | −54.858 | 0.300–7.800–0.300 | — | — |
| 16 | 47.206 | 14.546 | 1.58913 | 61.2 |
| 17 | −32.500 | 2.300 | 1.84666 | 23.8 |
| 18 | −75.809 | 40.684–11.740–1.000 | — | — |
| 19 | 22.906 | 5.000 | 1.62041 | 60.3 |
| 20 | 33.300 | — | — | — |

EXAMPLE 4

Figure 13:
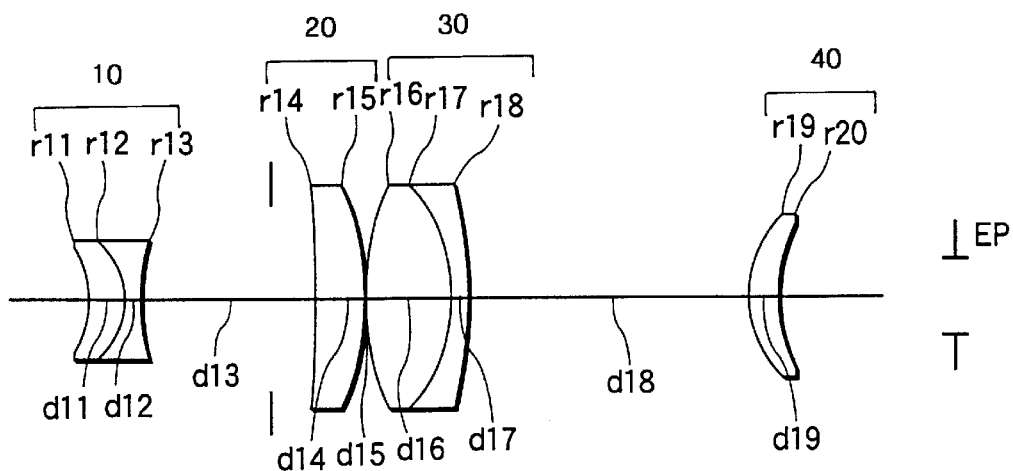
FIG. 13 is a simplified diagram showing schematically the lens configuration of the eyepiece variable focal length optics according to Example 4 of the invention.
Figure 14:
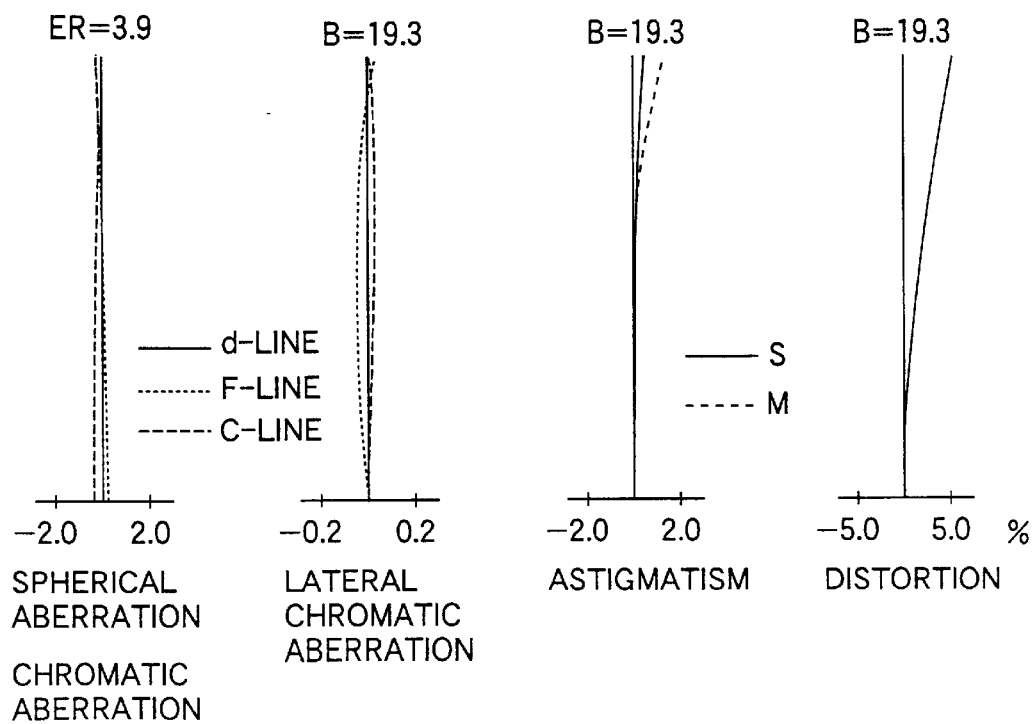
FIG. 14 is a graph showing the aberrations that occur in a system comprising objective optics and the lens configuration shown in FIG. 13 as the optics of FIG. 13 is set at the longest focal length state (to provide the lowest magnification of the overall optical system including the objective optics and the eyepiece variable focal length optics)
Figure 15:
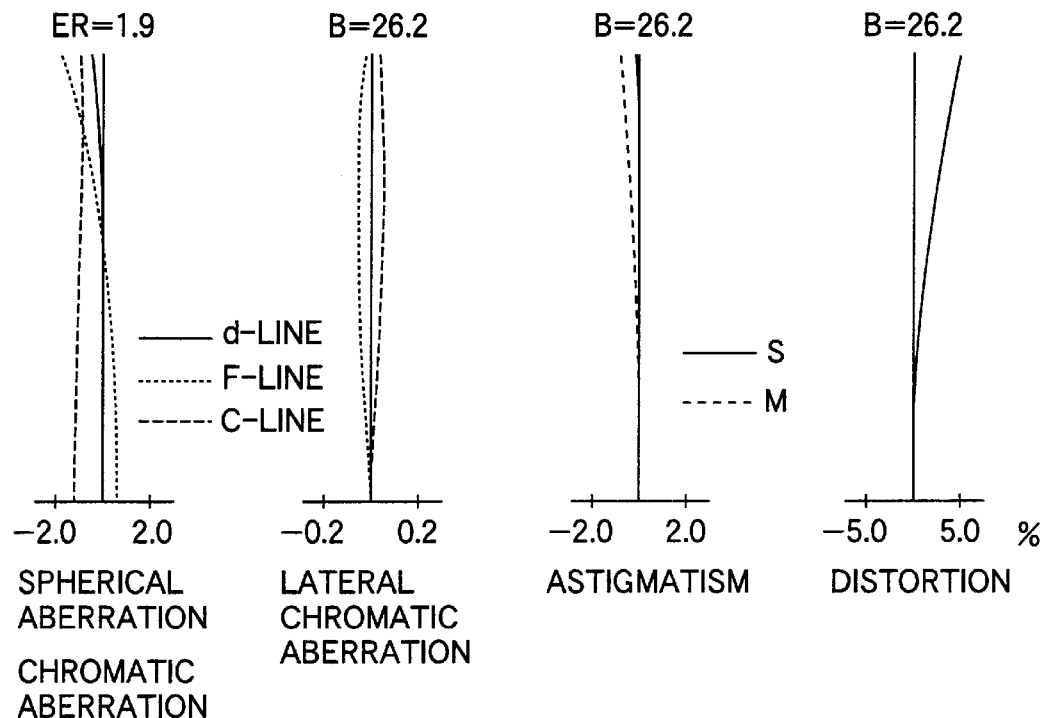
FIG. 15 is a graph showing the aberrations that occur in the same system as the lens configuration shown in FIG. 13 as the optics of FIG. 13 is set at the intermediate focal length state.
Figure 16:
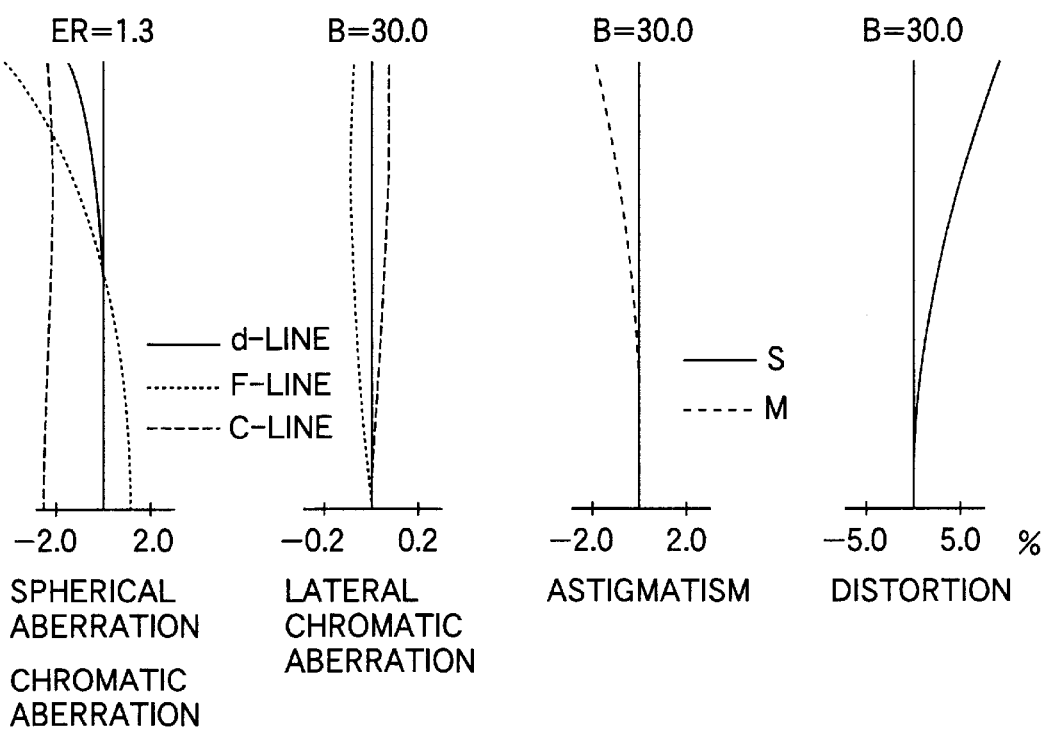
FIG. 16 is a graph showing the aberrations that occur in the same system as the lens configuration shown in FIG. 13 as the optics of FIG. 13 is set at the shortest focal length state (to provide the highest magnification of the overall optical system including the objective optics and the eyepiece variable focal length optics)

FIG. 13 shows the lens configuration of the eyepiece variable focal length optics according to Example 4 for the case where it is set at the longest focal length state (lowest magnification). FIGS. 14, 15 and 16 are graphs showing the aberrations that occur in the combination of the eyepiece variable focal length optics with the objective optics when the former optics are set at the longest focal length state, the intermediate focal length state (intermediate magnification) and the shortest focal length state (highest magnification), respectively. Table 4 lists the numerical data for the overall system including the objective optics. The basic lens configuration and the mode of lens group movements during variable focal length are the same as in Example 2. Field stop S is located 7.70 mm away from surface No. 14 toward the objective optics.

TABLE 4

W = 0.9–0.6–0.5
fo = 500.0
fe = 24.6–12.0–8.2 (variable power ratio: 3.0)
B = 19.3°–26.2°–30.0° (by half)
Eye relief = 15.2–18.0–20.6
Eyesight = −1

| Surface No. | r | d | $N_d$ | ν |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | −1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |
| 9 | ∞ | 53.600 | 1.51680 | 64.2 |
| 10 | ∞ | 48.931–43.215–41.212 | — | — |
| 11 | −19.435 | 6.000 | 1.84666 | 23.8 |
| 12 | −13.500 | 2.500 | 1.62041 | 60.3 |
| 13 | 88.080 | 24.281–51.940–73.370 | — | — |
| 14 | −243.141 | 6.844 | 1.69680 | 55.5 |
| 15 | −45.595 | 0.300–7.300–0.300 | — | — |
| 16 | 48.600 | 12.725 | 1.58913 | 61.2 |
| 17 | −32.500 | 2.300 | 1.84666 | 23.8 |
| 18 | −66.166 | 42.510–13.567–1.000 | — | — |
| 19 | 20.532 | 5.000 | 1.62041 | 60.3 |
| 20 | 33.300 | — | — | — |

Table 5 lists the values of conditions (1)–(4) as calculated for Examples 1–4.

TABLE 5

| | Condition (1) | Condition (2) | Condition (3) | Condition (4) |
|---|---|---|---|---|
| Example 1 | 0.84 | 9.80 | 3.17 | 0.45 |
| Example 2 | 0.91 | 9.15 | 2.60 | 0.52 |
| Example 3 | 0.90 | 8.89 | 2.97 | 0.52 |
| Example 4 | 0.85 | 8.92 | 2.14 | 0.44 |

Obviously, Examples 1–4 satisfy each of conditions (1)–(4) and achieve comparatively effective correction of aberrations.

According to the invention, there is provided eyepiece variable focal length optics that achieve variable power ratio of about 3 and which yet is compact and permits reasonably large apparent visual field and long eye relief.

What is claimed is:

1. Eyepiece variable focal length optics to be used in combination with objective optics, which comprise, in order from the objective optics, a negative first lens group, a positive second lens group, a positive third lens group and a positive fourth lens group, the first, second and third lens groups moving independently of each other along an optical axis during variable focal length but the fourth lens group being stationary, said eyepiece variable focal length optics satisfying the following condition (1):

$$0.4 < \{L23(\text{max}) - L23\}/f(h) \tag{1}$$

where

L23(max) is a maximum value of the axial air gap between the second and third lens groups during variable focal length;

L23 is the axial air gap between the second and third lens groups at a longest focal length state;

f(h) is the shortest focal length of the overall eyepiece variable focal length optics.

2. The eyepiece variable focal length optics according to claim 1, which further satisfies the following condition (2):

$$7.0 < L12/f(h) \tag{2}$$

where

L12 is the axial air gap between the first and second lens groups at a shortest focal length state.

3. The eyepiece variable focal length optics according to claim 2, which further satisfies the following conditions (3) and (4):

$$2.0 < f4/f23 < 4.0 \tag{3}$$

$$0.3 < f23/f2 < 0.6 \tag{4}$$

where f4 is the focal length of the fourth lens group;

f23 is the composite focal length of the second and third lens groups at the longest focal length state;

f2 is the focal length of the second lens group.

4. The eyepiece variable focal length optics according to claim 1, which further satisfies the following condition (1')

$$0.65 < \{L23(\text{max}) - L23\}/f(h). \tag{1'}$$

5. The eyepiece variable focal length optics according to claim 1, wherein during variable focal length from longest focal length side to shortest focal length side, the first lens group moves monotonically toward the objective optics, the second lens group moves monotonically toward the eye, and the third lens group moves toward the eye in such a way that the distance from the second lens group is first increased and then decreased.

* * * * *